US009485807B2

(12) United States Patent
Uchida et al.

(10) Patent No.: US 9,485,807 B2
(45) Date of Patent: Nov. 1, 2016

(54) LIQUID HEATING APPARATUS AND LIQUID HEATING METHOD

(75) Inventors: Minoru Uchida, Tokyo (JP); Tsuyoshi Maruyama, Hyogo (JP)

(73) Assignee: KURITA WATER INDUSTRIES LTD. (JP)

( * ) Notice: Subject to any disclaimer, the term of this patent is extended or adjusted under 35 U.S.C. 154(b) by 580 days.

(21) Appl. No.: 12/737,930

(22) PCT Filed: Aug. 31, 2009

(86) PCT No.: PCT/JP2009/004260

§ 371 (c)(1),
(2), (4) Date: Mar. 30, 2011

(87) PCT Pub. No.: WO2010/023959

PCT Pub. Date: Mar. 4, 2010

(65) Prior Publication Data

US 2011/0262120 A1 Oct. 27, 2011

(30) Foreign Application Priority Data

Sep. 1, 2008 (JP) ................................ 2008-223396

(51) Int. Cl.
*A47J 31/00* (2006.01)
*F24H 1/10* (2006.01)
(Continued)

(52) U.S. Cl.
CPC ................ *H05B 3/10* (2013.01); *F24H 1/101* (2013.01); *F24H 1/121* (2013.01); *F24H 1/162* (2013.01)

(58) Field of Classification Search
CPC ........ F24H 1/101; F24H 1/121; F24H 1/162; F24H 9/2028; H05B 3/10; A23B 4/0053; A23L 3/02
USPC ................ 392/465–469, 449, 484, 471, 481; 219/202, 494, 548, 553, 444.1, 219/628–629, 640
See application file for complete search history.

(56) References Cited

U.S. PATENT DOCUMENTS 1,436,889 A * 11/1922 Masseroni .................... 392/320
2,163,898 A * 6/1939 Van der Lande ............. 423/585
(Continued)

FOREIGN PATENT DOCUMENTS

CA 2237720 A1 * 10/1997
JP 50-73048 11/1948
(Continued)

OTHER PUBLICATIONS

Moran et al, Micro-Scale Regenerative Heat Exchanger, Oct. 1, 2004, NASA Technical Reports Server: http://ntrs.nasa.gov/search.jsp? R=20040171485.*

*Primary Examiner* — Thor Campbell
(74) *Attorney, Agent, or Firm* — Bakerhostetler LLP

(57) ABSTRACT

Provided is a liquid heating apparatus capable of heating fluid such as peroxosulfuric acid solution to high temperature in a short time. The heating apparatus includes: a flow channel member forming a flow channel 4 allowing liquid to flow and having flow channel thickness of 10 mm or smaller, the flow channel member composed of material transmitting near-infrared rays; and a near-infrared heaters 7, 8 placed over the outside of at least one of opposite flow channel surfaces of the flow channel and heating the liquid in the flow channel. The liquid flowing through the flow channel is instantaneously and evenly heated using near-infrared rays. It is preferable that spacers 6 be further provided within the flow channel 4 in order to limit the volume of the flow channel. Since not only the residence time in the heating apparatus can be shortened but the possible largest heat transfer area can be also maintained by decreasing the volume of the flow channel of the heating apparatus and by increasing the flow velocity in the heating apparatus, it is possible to increase the temperature of liquid to be heated to high temperature in a very short time even if the preset temperature of heat transfer surfaces is low.

20 Claims, 9 Drawing Sheets

(51) Int. Cl.

| | |
|---|---|
| ***H05B 3/10*** | (2006.01) |
| ***F24H 1/12*** | (2006.01) |
| ***F24H 1/16*** | (2006.01) |

(56) References Cited

U.S. PATENT DOCUMENTS

| | | | | | |
|---|---|---|---|---|---|
| 3,519,255 | A * | 7/1970 | Cooper | | 432/30 |
| 3,623,712 | A * | 11/1971 | McNeilly et al. | | 118/725 |
| 3,744,964 | A * | 7/1973 | Hart | | 432/120 |
| 3,934,117 | A * | 1/1976 | Schladitz | | 392/488 |
| 4,412,126 | A * | 10/1983 | Brockway | | 219/553 |
| 5,014,339 | A * | 5/1991 | Tattermusch | | 392/491 |
| 5,054,107 | A * | 10/1991 | Batchelder | | 392/483 |
| 5,054,108 | A * | 10/1991 | Gustin et al. | | 392/492 |
| 5,271,086 | A | 12/1993 | Kamiyama et al. | | |
| 5,408,578 | A * | 4/1995 | Bolivar | | 392/490 |
| 5,559,924 | A * | 9/1996 | Kadotani et al. | | 392/483 |
| 5,941,079 | A * | 8/1999 | Bowman et al. | | 62/6 |
| 6,148,145 | A * | 11/2000 | Kadotani | | 392/416 |
| 6,157,778 | A * | 12/2000 | Kadotani | | 392/483 |
| 6,250,379 | B1 * | 6/2001 | Geissler et al. | | 165/158 |
| 6,385,973 | B1 * | 5/2002 | Moran | | 60/520 |
| 6,460,348 | B2 * | 10/2002 | Okamura et al. | | 62/6 |
| 6,736,329 | B2 * | 5/2004 | Doclo | | 237/70 |
| 6,742,576 | B2 * | 6/2004 | Bergevin | | 165/133 |
| 6,793,831 | B1 * | 9/2004 | Paul et al. | | 216/36 |
| 6,868,230 | B2 * | 3/2005 | Gerhardinger | | 392/483 |
| 7,003,220 | B2 * | 2/2006 | Gerhardinger | | 392/483 |
| 7,185,697 | B2 * | 3/2007 | Goodson et al. | | 165/104.33 |
| 7,220,365 | B2 * | 5/2007 | Qu et al. | | 252/70 |
| 7,601,377 | B2 * | 10/2009 | Aksenov et al. | | 426/475 |
| 2003/0066638 | A1 * | 4/2003 | Qu et al. | | 165/186 |
| 2004/0096204 | A1 * | 5/2004 | Gerhardinger | | 392/483 |
| 2004/0256375 | A1 * | 12/2004 | Loktev et al. | | 219/438 |
| 2005/0087525 | A1 * | 4/2005 | Gerhardinger | | 219/541 |
| 2005/0129580 | A1 * | 6/2005 | Swinehart et al. | | 422/100 |
| 2006/0201163 | A1 * | 9/2006 | Haefner et al. | | 62/6 |
| 2007/0106197 | A1 * | 5/2007 | Lauman et al. | | 604/6.08 |
| 2008/0092527 | A1 * | 4/2008 | Ripper et al. | | 60/286 |
| 2008/0210402 | A1 * | 9/2008 | Kidwell et al. | | 165/45 |
| 2008/0277095 | A1 * | 11/2008 | Zhai | | 165/80.4 |

FOREIGN PATENT DOCUMENTS

| | | | |
|---|---|---|---|
| JP | 52-30624 | | 7/1977 |
| JP | 5-79695 | | 3/1993 |
| JP | 06-029275 | | 2/1994 |
| JP | 07019024 | A * | 1/1995 |
| JP | 3043543 | | 9/1997 |
| JP | 3044232 | | 10/1997 |
| JP | 2741365 | | 1/1998 |
| JP | 10-209125 | | 8/1998 |
| JP | 10-259955 | | 9/1998 |
| JP | 2000-055460 | | 2/2000 |
| JP | 2000-311768 | | 11/2000 |
| JP | 3180920 | | 4/2001 |
| JP | 2001-141300 | | 5/2001 |
| JP | 2004-85158 | | 3/2004 |
| JP | 2006-38270 | | 2/2006 |
| JP | 2008-138904 | | 6/2006 |
| WO | WO 2006037710 | A1 * | 4/2006 |

* cited by examiner (a)

(b)

LIQUID HEATING APPARATUS AND LIQUID HEATING METHOD

TECHNICAL FIELD

The present invention relates to a liquid heating apparatus capable of highly efficiently heating liquid in a short time. The present invention particularly relates to a liquid heating apparatus that can be suitably used to rapidly heat cleaning fluid at a resist stripping step included in semiconductor manufacturing process and to a liquid heating method therefore.

BACKGROUND ART

As a method used at a resist stripping step in semiconductor fabrication, a sulfuric acid electrolytic method has been known wherein sulfuric acid solution is electrolyzed to form peroxosulfuric acid (peroxodisulfuric acid: molecular peroxosulfuric acid and ionic peroxosulfuric acid) and then cleaning is performed using the peroxosulfuric acid solution as cleaning fluid. Resist stripping efficiently proceeds at a resist stripping step, when the temperature of cleaning fluid is elevated (to about 120° C. to 190° C.). It can be considered that this is because when the temperature of cleaning fluid produced using such a sulfuric acid electrolytic method is increased to a predetermined high temperature, peroxosulfuric acid in the cleaning fluid autolyzes, and sulfate radicals having extremely strong oxidation power are thus generated and contribute to cleaning.

Radicals have only short lifetime, and therefore, if the temperature of cleaning fluid is raised earlier, peroxosulfuric acid in the cleaning fluid will autolyze too early and its radicals will be consumed without contributing to cleaning. When the temperature of peroxosulfuric acid solution is increased to high temperature, peroxosulfuric acid autolyzes to generate sulfate radicals, and the concentration of sulfate radicals consequently increases. The generated sulfate radicals simultaneously decompose to decrease the concentration of sulfate radicals. The concentration of sulfate radicals peaks after several tenths of a second to several seconds from the elevation of the temperature of peroxosulfuric acid solution, the time interval varying also based on the temperature of the solution. Therefore, since it is most efficient to set the timing of elevating temperature in such a manner as to contribute to cleaning just when the concentration of sulfate radicals reaches its peak, it is necessary to appropriately set optimum timing.

If cleaning fluid is slowly heated over a long time (for example, for several minutes), the autolysis of peroxosulfuric acid and the associated decomposition of sulfate radicals proceed during the elevation of temperature. Therefore, at the time of the completion of the elevation of temperature, the concentration of peroxosulfuric acid is already low. Results shown in FIG. 7 are obtained by theoretically calculating based on reaction kinetics and Arrhenius equation, and the results show that lifetime of peroxosulfuric acid is extremely short under high temperature.

As seen from the above, it is necessary to perform the elevation of temperature of cleaning fluid in a very short time (in several seconds) immediately before cleaning.

On the other hand, under lower temperature, the efficiency of the electrolysis of sulfuric acid solution is higher and the rate of the autolysis of peroxosulfuric acid is lower. It is thus preferable that sulfuric acid solution be electrolyzed at low temperature (about 20° C. to 60° C.). When used as cleaning fluid at a resist stripping step, it is necessary to instantaneously elevate sulfuric acid solution, which is electrolyzed at low temperature, to high temperature from low temperature immediately before cleaning.

Various apparatus for heating fluid have been proposed. For example, such a fluid heating apparatus 40 as shown in FIG. 8 has been conventionally used in a step of heating pure water or the like in semiconductor fabrication. The fluid heating apparatus 40 includes: a closed quartz vessel 41 in the shape of a tube; a liquid inlet 41*a* and a liquid outlet 41*b* provided obliquely with each other on a side wall of the closed quartz vessel 41; and an infrared heater 42 in the closed quartz vessel 41. Pure water or the like flows into the closed quartz vessel 41 through the liquid inlet 41*a*, is heated by being contacted with the circumference of the infrared heater 42, and then discharged out of the liquid outlet 41*b*.

In addition, a fluid heating apparatus 50 as shown in FIG. 9 is known. The fluid heating apparatus 50 includes a double-tube structure. Liquid to be heated flows via an inlet 51*a* for the liquid to be heated and an outlet 51*b* for the liquid to be heated both provided for an inner tube 51. On the other hand, heat transfer oil flows through between the inner tube 51 and an outer tube 52 via an inlet 52*a* for the heat transfer oil and an outlet 52*b* for the heat transfer oil both provided for the outer tube 52. The fluid to be heated is heated due to the heat exchange between these fluids through a wall of the inner tube 51.

Moreover, a fluid heating apparatus has also been proposed in which heating efficiency is improved by providing a flow channel for fluid to be heated along both outer and inner circumferences of a tubular ceramic heater (see Patent Document 1).

RELATED ART DOCUMENT

Patent Document

Patent Document 1: Japanese Unexamined Patent Application Publication No. H05 (1993)-79695

SUMMARY OF THE INVENTION

Problems that the Invention is to Solve

If high-temperature fluid such as heat transfer oil is used as a heating source like the foregoing fluid heating apparatus 50, for example, heat is transferred by conductive heat transfer and forced-convective heat transfer in the order of oil, quartz wall and solution. In order to transfer a large amount of heat in a short time by the above heat transfer method, it is preferable to increase the temperature of heat transfer oil to the highest possible temperature (for example, 1000° C. or higher). The highest usable temperature of heat transfer oil industrially used, however, is only about 350° C. to 400° C. Since the heat volume of heating source is large in case of the method using heat transfer oil or the like, it is difficult to instantaneously start and stop rapid heating.

In contrast, if a near-infrared heater emitting near-infrared rays, such as a halogen lamp heater, is used, heat energy is directly transferred to fluid through radiant heat from light. Near-infrared rays having wavelength of 0.8 micrometers to several micrometers pass through quartz, and 99% or more thereof is absorbed by a water layer having thickness of several millimeters to several tens of millimeters. In case of a lamp heater, heating can be instantaneously started and stopped by turning on and off, and heating temperature can also be adjusted as desired using lamp output. Therefore, near-infrared lamp heaters have conventionally used for heating high-concentration sulfuric acid solution.

In case of the foregoing fluid heating apparatus 40, for example, however, ultrapure water and chemical solution are heated at the rate of several liters per minute. In this case, the volume of a quartz vessel becomes several liters due to the output and dimensions of lamp, and liquid residence time thus becomes as long as 1 to 2 minutes. If the chemical liquid contains peroxosulfuric acid in it, the autolysis of peroxosulfuric acid proceeds, and peroxosulfuric acid is thus wasted.

Therefore, when using the fluid heating apparatus 40, it is necessary to set the temperature of a heat transfer surface to extremely high temperature (about 300° C. to 500° C. varying also based on the heat resistance of components). However, when setting the temperature of a heat transfer surface to extremely high temperature, the autolysis rate of peroxosulfuric acid extremely increases locally at the heat transfer surface, and peroxosulfuric acid is consequently wasted. Therefore, the concentration of peroxosulfuric acid becomes lower after the temperature elevation. Hence, it is necessary to increase the temperature of sulfuric acid solution while suppressing the autolysis of peroxosulfuric acid within a heating apparatus as much as possible by not setting the temperature of a heat transfer surface to high temperature, and to activate the autolysis of peroxosulfuric acid using the high temperature of sulfuric acid solution.

However, even if heating is performed with the foregoing well-known heating apparatuses, it is difficult to heat sulfuric acid solution to high temperature in a short time while maintaining the concentration of peroxosulfuric acid. That is, under the condition that heat transfer medium is used or even under the condition that a lamp is used as a heating apparatus, if a liquid flow channel has too large flow channel thickness, radiant heat from light is not transferred to distant liquid. Therefore, it is impossible to evenly increase the temperature of entire liquid.

In consideration of above, it is an object of the present invention to provide a liquid heating apparatus capable of heating liquid to be heated of low temperature to high temperature in a short time without setting the temperature of a heat transfer surface to high temperature and a liquid heating method therefore.

Means for Solving the Problems

The liquid heating apparatus of a first aspect of the present invention includes: a flow channel member forming a flow channel allowing liquid to flow and having flow channel thickness of 10 mm or smaller, the flow channel member composed of material transmitting near-infrared rays; and a near-infrared heater placed over the outside of at least one of opposite flow channel surfaces of the flow channel and heating the liquid in the flow channel.

The liquid heating apparatus of a second aspect of the present invention is characterized in that the near-infrared heaters may be placed over the outside of both the flow channel surfaces in the first aspect of the present invention.

The liquid heating apparatus of a third aspect of the present invention is characterized in that the flow channel may be an annular flow channel in the first or second aspect of the present invention.

The liquid heating apparatus of a fourth aspect of the present invention is characterized in that at least a portion of the flow channel member, the portion forming the flow channel surface of the side where the near-infrared heater is placed, may be composed of quartz in any one of the first to third aspects of the present invention.

The liquid heating apparatus of a fifth aspect of the present invention may further include a spacer placed or encapsulated within the flow channel to reduce volume of the flow channel in any one of the first to fourth aspects of the present invention.

The liquid heating apparatus of a sixth aspect of the present invention is characterized in that the spacers may be plural in the fifth aspect of the present invention.

The liquid heating apparatus of a seventh aspect of the present invention is characterized in that the spacers may be granular-shaped and filled in the flow channel in the sixth aspect of the present invention.

The liquid heating apparatus of a eighth aspect of the present invention is characterized in that the spacers may be rod-shaped along liquid flowing direction and arranged in rows within the flow channel in the sixth aspect of the present invention.

The liquid heating apparatus of a ninth aspect of the present invention is characterized in that the spacer may be composed of quartz in any one of the fifth to eighth aspects of the present invention.

The liquid heating apparatus of a tenth aspect of the present invention is characterized in that an orifice and/or a header may be formed at a liquid inlet portion and/or a liquid outlet portion of the flow channel in such a manner as to have enlarged flow channel area to promote even distribution of the liquid in any one of the first to ninth aspects of the present invention.

The liquid heating apparatus of an eleventh aspect of the present invention is characterized in that the liquid may be sulfuric acid solution with concentration of 65% to 96% by weight in any one of the first to tenth aspects of the present invention.

A liquid heating method of a twelfth aspect of the present invention includes: using the liquid heating apparatus according to any one of the first to eleventh aspects of the present invention to heat a liquid in the liquid heating apparatus maintaining residence time of the liquid in the liquid heating apparatus within a range of 0.5 to 5 seconds.

A liquid heating method of a thirteenth aspect of the present invention is characterized in that liquid temperature may differ by 50° C. or more between the liquid inlet portion and the liquid outlet portion in the flow channel of the liquid heating apparatus in the twelfth aspect of the present invention.

A liquid heating method of a fourteenth aspect of the present invention is characterized in that liquid temperature may be 60° C. to 80° C. at the liquid inlet portion, and liquid temperature may be 120° C. to 190° C. at the liquid outlet portion in the liquid heating method in the thirteenth aspect of the present invention.

Effect of the Invention

Since a liquid heating apparatus according to the present invention includes: a flow channel member forming a flow channel allowing liquid to flow and having flow channel thickness of 10 mm or smaller, the flow channel member composed of material transmitting near-infrared rays; and a near-infrared heater placed over the outside of at least one of opposite flow channel surfaces of the flow channel and heating the liquid in the flow channel, it is possible to instantaneously and evenly heat the liquid.

From the point of view of instantaneous and even heating of liquid, it is more preferable that the flow channel thickness is 5 mm or smaller. Further, in order to secure sufficient liquid flow, the flow channel thickness is preferably 1 mm or bigger, more preferably 2 mm or bigger. Moreover, in order to allow fluid to evenly flow through the flow channel, it is preferable that the flow channel thickness be substantially constant.

Since near-infrared rays pass through quartz, a flow channel member and spacers composed of quartz do not prevent heat transfer, and it is possible to efficiently transfer heat.

Since it is difficult to delicately process quartz, it has been difficult to form a flow channel having a narrow flow channel area, that is, small volume. According to another present invention using spacers, however, a flow channel having an appropriately narrow flow channel area can be formed by simple work, i.e., inserting the spacers into a flow channel of a quartz tube commercially available.

According to the present invention, the shape of spacers is not particularly limited. Spacers may be rod-shaped or granular-shaped, for example. In case of rod-shaped or granular-shaped spacers, small clearance is formed between a flow channel and each spacer by making the diameter of spacers some smaller than flow channel thickness, and liquid thus rapidly flows.

According to another aspect of the present invention, since pressure loss is provided by forming a header at a liquid inlet portion and a small hole such as an orifice at between the header and a flow channel performing heating, it is possible to equalize the distribution of flow volume within a flow channel even in case of a narrow flow channel, that is, in such a case where plural spacers are inserted therein, for example. Note that the residence time of high-temperature liquid can be shortened by reducing the volume of a header at a liquid outlet portion.

According to a liquid heating method of the present invention, since the liquid heating apparatus according to the present invention is used to heat a liquid in the liquid heating apparatus maintaining the residence time of the liquid in the liquid heating apparatus within the range of 0.5 to 5 seconds, it is possible to instantaneously heat the liquid without causing any change in the composition of the liquid and so on.

Residence time of the liquid in the liquid heating apparatus (liquid flow time) is preferably 5 seconds or shorter, more preferably 2 seconds or shorter to suffice instantaneous heating. On the other hand, in case of the residence time shorter than 0.5 seconds, it is necessary to set flow channel thickness within the range of 1 mm or smaller or a heat flux of a heater within the range of 30 to 50 W/cm$^2$ or higher. Since structural problem thus arises, 0.5 second or longer is preferable. For the same reason, 1 second or longer is more preferable.

EMBODIMENTS FOR CARRYING OUT THE INVENTION

First Embodiment

A liquid heating apparatus according to an embodiment of the present invention will be described below.

Figure 1:
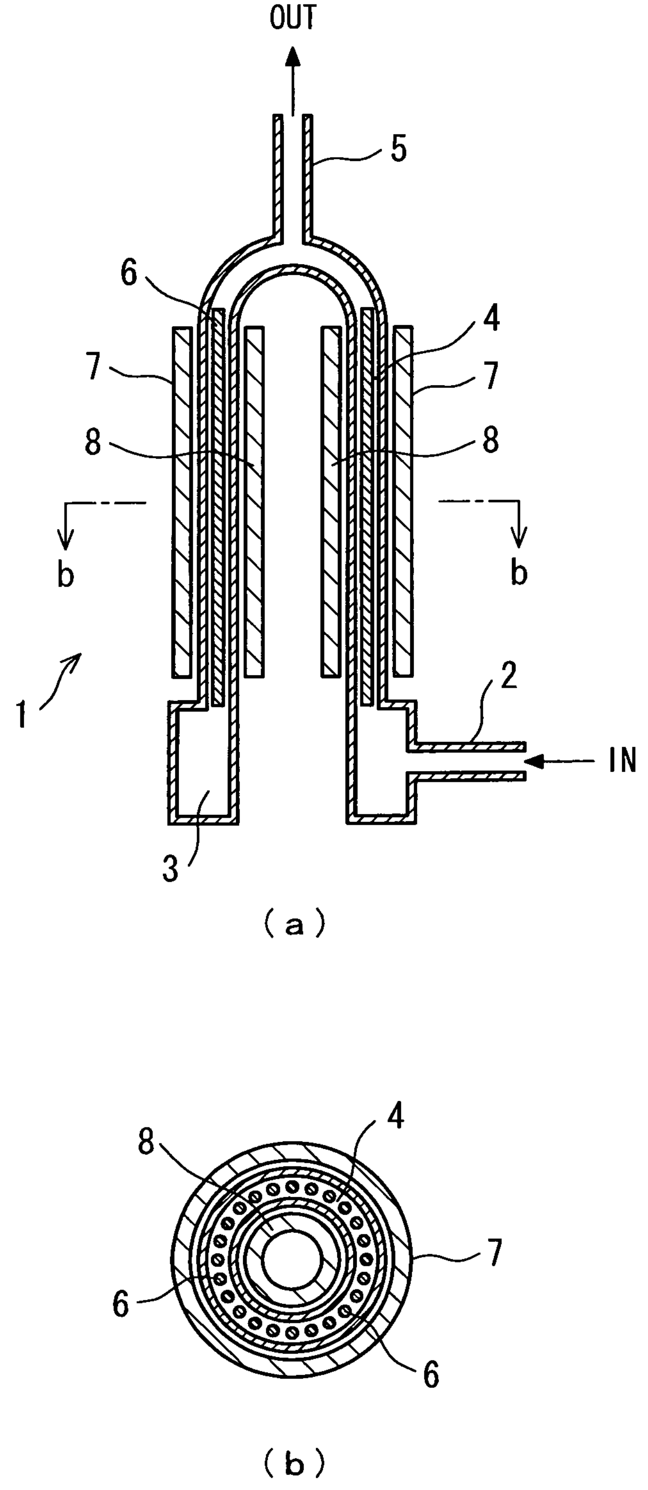
FIG. 1(*a*) is a schematic cross-sectional view of a liquid heating apparatus according to an embodiment of the present invention along the longitudinal direction thereof, and FIG. 1(*b*) is a cross-sectional view taken from line b-b in FIG. 1(*a*)

FIG. 1 is a schematic diagram of the liquid heating apparatus 1.

An annular flow channel 4 is formed with a double-tube structure where the diameters of two tubes are approximate as shown in the figure; that is, the annular flow channel 4 is provided between an inner tube and an outer tube, and its flow channel thickness is set at 10 mm or smaller. It is preferable that the annular flow channel 4 is vertically installed. In the installed condition, a tubular large-volume header 3 communicates with the lower side (liquid inflow side) of the annular flow channel 4. The header 3 is provided with a lower inflow port 2. Liquid to be heated flows into through the lower inflow port 2, and upward flow along the direction of the axis of the annular flow channel 4 is thereby generated in the annular flow channel 4 through the header 3. The upper side of the annular flow channel 4 is gradually reduced a diameter and concentrated to the center so that the annular flow channel 4 communicates with an upward-open upper outflow port 5. The liquid to be heated flows through the annular flow channel 4 and then flows out through the upper outflow port 5. The annular flow channel 4 and the header 3 are made of quartz exhibiting nonelution, oxidation-resisting, and heat-resisting properties. Quartz has a heat conductivity of 1.0 W/m/k and therefore has good heat transfer properties.

Rod-shaped spacers 6 with a diameter smaller than the flow channel thickness are arranged parallel to one another across the entire circumference of the annular flow channel 4, but the spacers 6 are not fixed to the inside of the flow channel. By making the flow channel thickness at the height near the inflow port of the annular flow channel 4 smaller than the diameter of the rod-shaped spacers 6, the rod-shaped spacers 6 can be held within the annular flow channel 4 without falling. Above the height near the inflow port, small clearance is formed among the rod-shaped spacer 6 and an inside inner circumference surface and an outside inner circumference surface of the annular flow channel 4. Clearance may be formed among the rod-shaped spacers 6, or such many rod-shaped spacers 6 as being contacted with each other may be arranged within the annular flow channel 4.

Although rod-shaped spacers 6 are adopted as spacers in this embodiment, the present invention is not limited to such a shape. That is, the shape of spacers is not particularly limited provided that the spacers have the effect of achieving predetermined residence time within a heating apparatus by decreasing inner cross sectional area of an annular flow channel. For example, spherical or arc-shaped spacers may be adopted. As a material for the spacers, quartz exhibiting nonelution, oxidation-resisting, and heat-resisting properties is used as in the case of the flow channel member. The rod-shaped spacers 6, however, are much preferred because they also have the effect of guiding liquid to be heated in the direction of the axis of the annular flow channel 4 to allow the liquid to be heated to flow smoothly.

An external heater 7 is provided on the outer circumference side of the annular flow channel 4, and an internal heater 8 is provided on the inner circumference side of the annular flow channel 4. The above structure constitutes the liquid heating apparatus 1 according to the present invention. It is desirable that the heaters evenly heat the outer circumference surface and/or the inner circumference surface of the annular flow channel 4.

Figure 2:
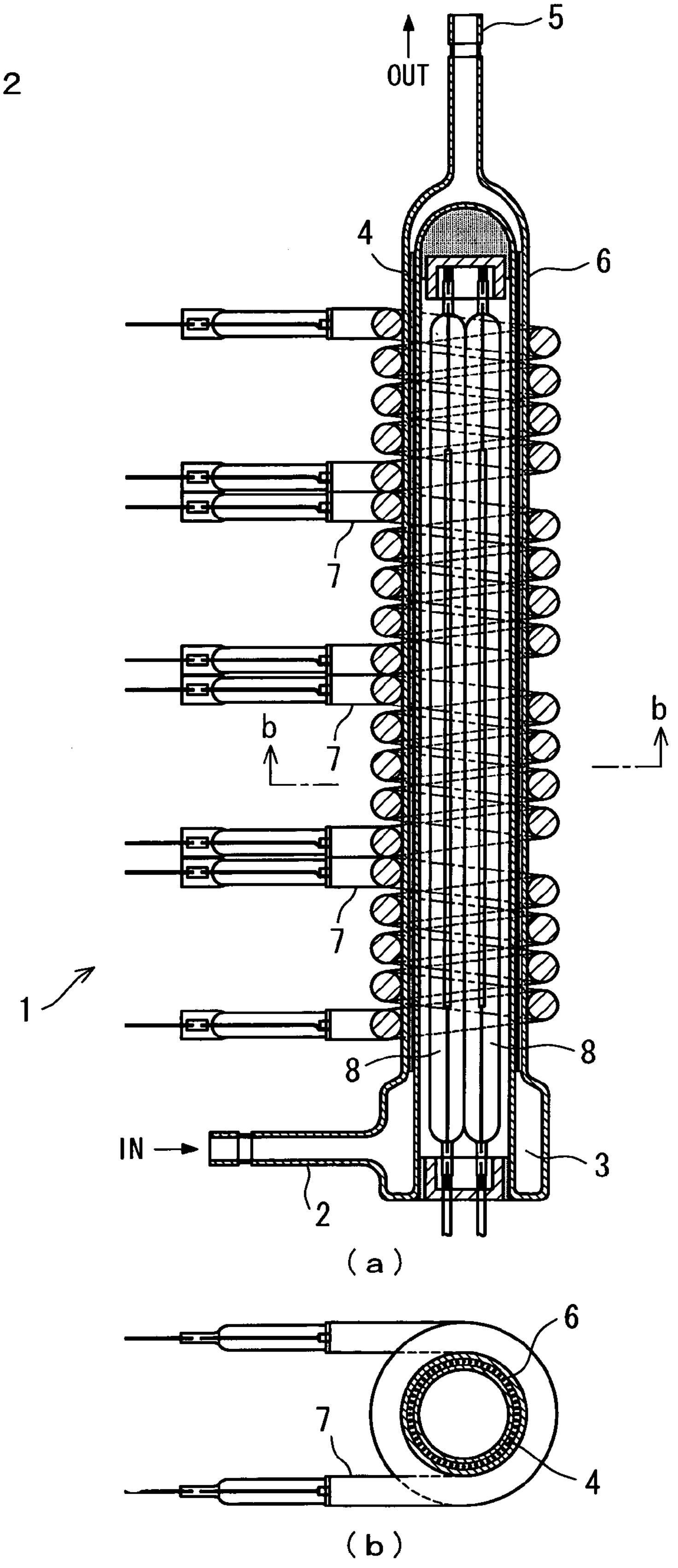
FIG. 2(*a*) is a detailed cross-sectional view of the above liquid heating apparatus along the longitudinal direction thereof, and FIG. 2(*b*) is a cross-sectional view taken from line b-b in FIG. 2(*a*)

FIG. 2 more specifically shows the liquid heating apparatus 1 in detail.

In FIG. 2, two straight-tube halogen heaters as the internal heater 8 are placed in a center portion of the annular flow channel 4 on the inner circumference side. Halogen heaters as the external heater 7 are placed on the outer circumference side of the annular flow channel 4. Note that heat sources can be appropriately selected in accordance with the purpose. As an external heater, spiral heaters may be placed to encircle the flow channel member. The internal heaters 8 and the external heaters 7 correspond to near-infrared heaters according to the present invention, and each includes a halogen heater to emit near-infrared rays (with wavelength of 0.8 to 2.5 μm).

A method for fixing the components constituting the liquid heating apparatus 1 is not particularly limited on condition that the components are placed as shown in FIG. 2. As the simplest method, it can be considered that, for example, the lower part of the quartz tube body of the annular flow channel 4 and an upper nozzle having the upper outflow port 5 are held with clamps or the like attached to a support column separately provided. In the case of the external heater 7 in the spiral shape, it is composed of several heaters, and each heater is held with a clamp or the like. Since outer surfaces of the halogen heaters are coated with reflective material, setup must be carefully performed in order that the material is prevented from being rubbed and falling off. Likewise, the internal heaters are supported at their lower portions.

When setting up the liquid heating apparatus 1, it is important to install the liquid heating apparatus 1 vertically so as to allow liquid to flow upward. It is consequently possible to avoid troubles such as the reduction in heat transfer efficiency due to the residence of bubbles generated from boiling or the like within a flow channel, and it can be expected that liquid flows evenly.

With the liquid heating apparatus 1 according to the first embodiment of the present invention, liquid flows while the residence time of the liquid is maintained within the range of 0.5 to 5 seconds, and the liquid is reliably heated. For example, the liquid residence time required for heating 2 liter/min of solution at 60° C. to 150° C. is 1.5 seconds. This is because the plurality of rod-shaped spacers 6 is placed within the annular flow channel 4 to reduce the flow channel area and allow liquid to flow while being contacted with heating surfaces facing the heaters. In the case where sulfuric acid solution is used as liquid to be heated, it is possible to avoid boiling of the sulfuric acid solution or the rapid autolysis of peroxosulfuric acid (peroxodisulfuric acid) since the temperature of a liquid-contacting heating surface is 200° C. or lower.

Figure 3:
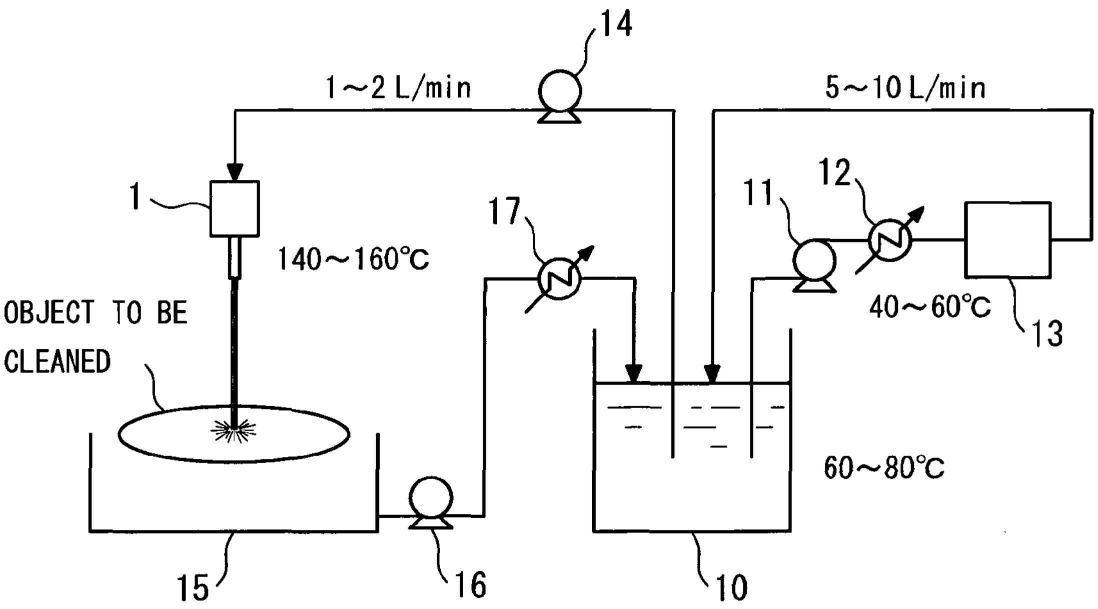
FIG. 3 is a diagram showing a single-wafer resist stripping system in which the liquid heating apparatus according to the embodiment is used.

A liquid heating apparatus according to the present invention can be used in a resist stripping application by, for example, incorporating it in such a single-wafer resist stripping system as shown in FIG. 3.

The system is provided with a reservoir 10 in which sulfuric acid solution containing peroxosulfuric acid, i.e., peroxodisulfuric acid, hereinafter the sulfuric acid solution of this type referred to as peroxosulfuric acid solution, is stored, an electrolytic device 13 that electrolyzes sulfate ions to generate persulfate ions, and a cleaning device 15. The peroxosulfuric acid solution in the reservoir 10 is held at temperature of 60° C. to 80° C., cooled with a heat exchanger 12 to temperature suitable for electrolysis (40° C. to 60° C.) while being fed with a pump 11, and then supplied to the electrolytic device 13. In the electrolytic device 13, persulfate ions are generated from sulfate ions by electrolysis. The peroxosulfuric acid solution is circulated between the electrolytic device 13 and the reservoir 10 at the flow rate of, for example, 5 to 10 liter/min. And further, the peroxosulfuric acid solution in the reservoir 10 is drawn therefrom with a pump 14 at the flow rate of, for example, 1 to 2 liter/min, heated to high temperature (for example, 120° C. to 190° C., preferably 140° C. to 160° C.) in a short time with the above liquid heating apparatus 1, and then allowed to flow down to an object to be cleaned (for example, a semiconductor wafer) accommodated in the cleaning device 15 to clean the object to be cleaned. Since the peroxosulfuric acid solution is rapidly heated to the high temperature with the liquid heating apparatus 1 in this event, the peroxosulfuric acid solution does not autolyze excessively. The peroxosulfuric acid solution keeping high cleaning power is thus supplied to the cleaning device 15. The solution used at the cleaning device 15 is drawn therefrom with a pump 16, cooled with a heat exchanger 17, and then fed back to the reservoir 10.

Figure 4:
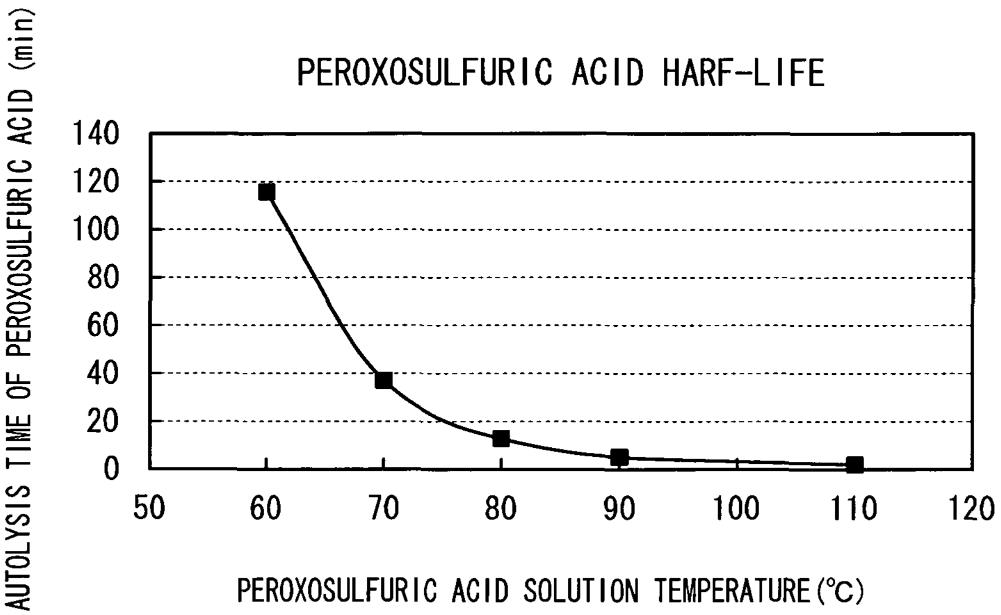
FIG. 4 is a graph showing the relationship between the temperature of peroxosulfuric acid solution (60° C. to 110° C.) and the half-life of peroxosulfuric acid.

When using a liquid heating apparatus according to the present invention and performing such single wafer cleaning using peroxosulfuric acid solution as in the system shown in FIG. 3, sulfuric acid solution containing peroxosulfuric acid must be instantaneously heated to about 150° C. with the liquid heating apparatus 1. Therefore, it is necessary to maintain appropriate temperature of the solution at a previous apparatus. It is thus preferable that the reservoir 10 is positioned prior to the liquid heating apparatus 1 in the system, and the temperature in the reservoir is maintain at 60° C. to 80° C., as in the system shown in FIG. 3. The reason is that if the temperature in the reservoir is lower than 60° C., the load on the liquid heating apparatus 1 according to the present invention is too heavy, or if the temperature is higher than 80° C., the rate of the autolysis of the peroxosulfuric acid is too fast, and the concentration of the peroxosulfuric acid in the reservoir 10 cannot be maintained at high level (see the graph of "peroxosulfuric acid solution temperature vs peroxosulfuric acid autolysis" in FIG. 4).

In the system shown in FIG. 3, sulfuric acid solution drawn from the reservoir 10 is cooled and electrolyzed and then fed back to the reservoir 10. In consideration of the fact that the temperature suitable for electrolysis is in the range from 40° C. to 60° C., and the temperature increases by about 20° C. to the range from 60° C. to 80° C. after electrolysis, it is not necessary to separately adjust the temperature of sulfuric acid solution in the reservoir 10 if sulfuric acid solution is cooled to the range from 40° C. to 60° C. before electrolysis. The above structure is thus adopted.

Sulfuric acid solution to be electrolyzed especially at this system preferably has concentration of 75% to 96% by weight. Resist stripping requires both of the power for penetrating between a resist and a silicon substrate (penetration power) and the power for oxidizing the resist (oxidation power). The lower concentration of sulfuric acid causes to be the higher the efficiency of the formation of peroxosulfuric acid having oxidation power. The higher concentration of sulfuric acid causes to be the greater penetration power. Therefore, an optimum sulfuric acid concentration is selected from the above range based on the kind of resist, the shape of pattern formed on silicon substrate, and so on.

In the liquid heating apparatus 1, sulfuric acid solution at 60° C. to 80° C. is heated preferably to 120° C. to 190° C., and more preferably to 140° C. to 160° C., as described above. The sulfuric acid solution containing peroxosulfuric acid at such temperature exhibits excellent cleaning power due to the oxidation power of peroxosulfuric acid. Since high-temperature peroxosulfuric acid autolyzes rapidly as described above, the residence time in the liquid heating apparatus is maintained for 5 seconds or shorter (preferably 2 seconds or shorter). It is thus possible to use the peroxosulfuric acid for cleaning before the progress of the autolysis of the peroxosulfuric acid.

Second Embodiment

Figure 5:
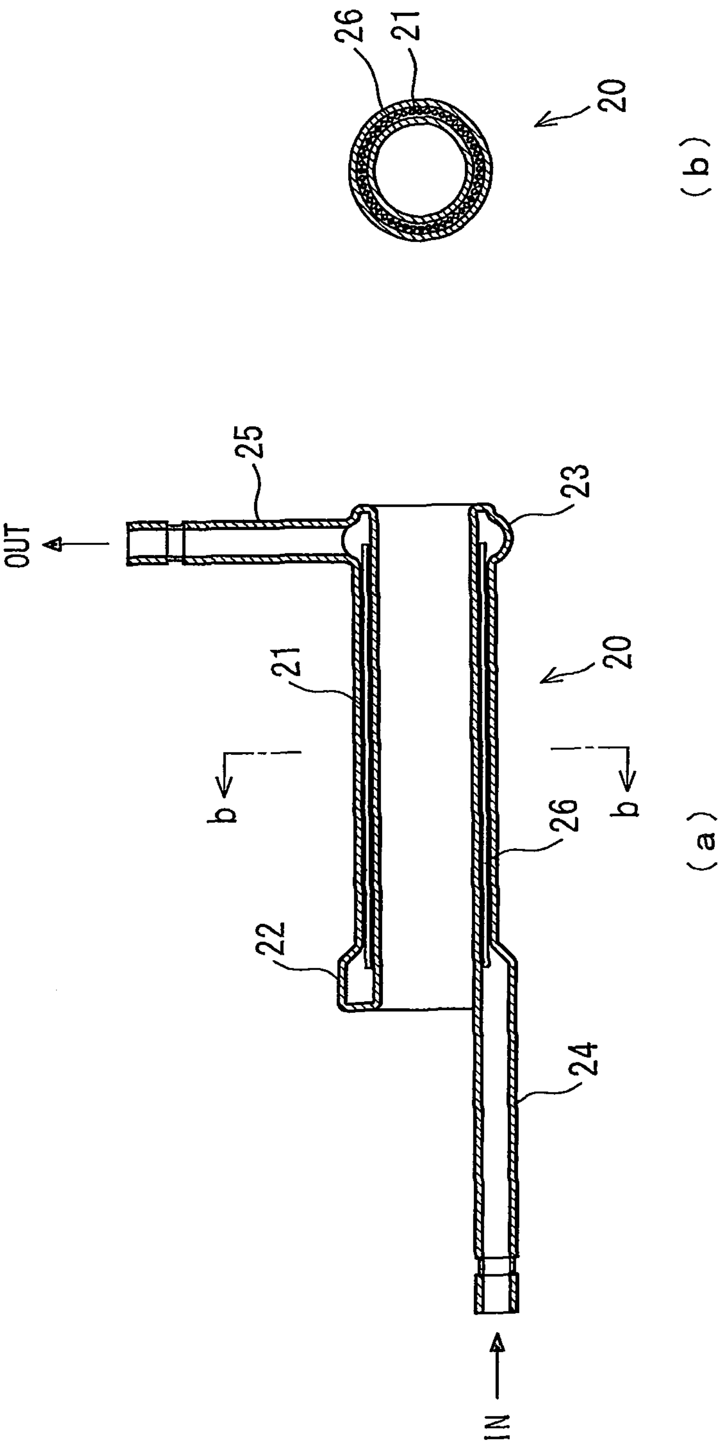
FIG. 5(*a*) is a schematic cross-sectional view of a liquid heating apparatus according to another embodiment of the present invention along longitudinal direction thereof, and FIG. 5(*b*) is a cross-sectional view taken from line b-b in FIG. 5(*a*)

In the liquid heating apparatus 1 according to the first embodiment, the upper side of the annular flow channel 4 is gradually reduced a diameter and concentrated to the center. Instead of the annular flow channel 4 reduced at an end to collect solution, a flow channel may extend while keeping annular shape. Another embodiment of the liquid heating apparatus according to the present invention will be described below with reference to FIG. 5.

A liquid heating apparatus 20 according to this embodiment has an annular flow channel 21 including a double-wall quartz tube, and the flow channel thickness of the annular flow channel 21 is set at 10 mm or smaller. Tubular headers 22 and 23 formed by partially making a flow channel thickness wider are provided, respectively, continuously with both ends of the annular flow channel 21. The header 22 at one end is provided at a liquid inlet portion, and an inflow tube 24 along longitudinal direction of the annular flow channel 21 is connected to the header 22. On the other hand, the header 23 at the other end is provided at a liquid outlet portion, and an outflow tube 25 along radial direction of the annular flow channel 21 is connected to the header 23. Plural rod-shaped spacers 26 along longitudinal direction of the annular flow channel 21 are arranged in rows across the entire circumference of the annular flow channel 21. The rod-shaped spacers 26 are made of quartz and each has a diameter securing a small clearance between each rod-shaped spacer 26 and each of inner circumference surfaces of the annular flow channel 21 (diameter smaller than the flow channel thickness). Although not shown, plural near-infrared heaters are placed in such a manner as to penetrate inside the annular flow channel 21 along solution flowing direction, and a near-infrared heater is placed in such a manner as to cover the outside of the annular flow channel.

In the liquid heating apparatus 20, liquid introduced from the inflow tube 24 is distributed evenly into the annular flow channel 21 through the header 22, and the liquid is allowed to flow in longitudinal direction of the annular flow channel 21. Since the flow channel is restricted with the rod-shaped spacers 26 in the annular flow channel 21, the liquid smoothly flows while facing the heaters and is consequently heated evenly and instantaneously with the near-infrared heaters. The heated liquid flows out of the liquid heating apparatus 20 through the header 23 by means of the outflow tube 25. The liquid heating apparatus 20 according to this embodiment can be applied to the above system similarly as the liquid heating apparatus 1.

Third Embodiment

In the second embodiment, near-infrared heaters are placed on both the outer circumference side and the inner circumference side of the annular flow channel. In one embodiment of the present invention, however, near-infrared heaters may be placed over the outside of only one of opposite flow channel surfaces of a flow channel.

Figure 6:
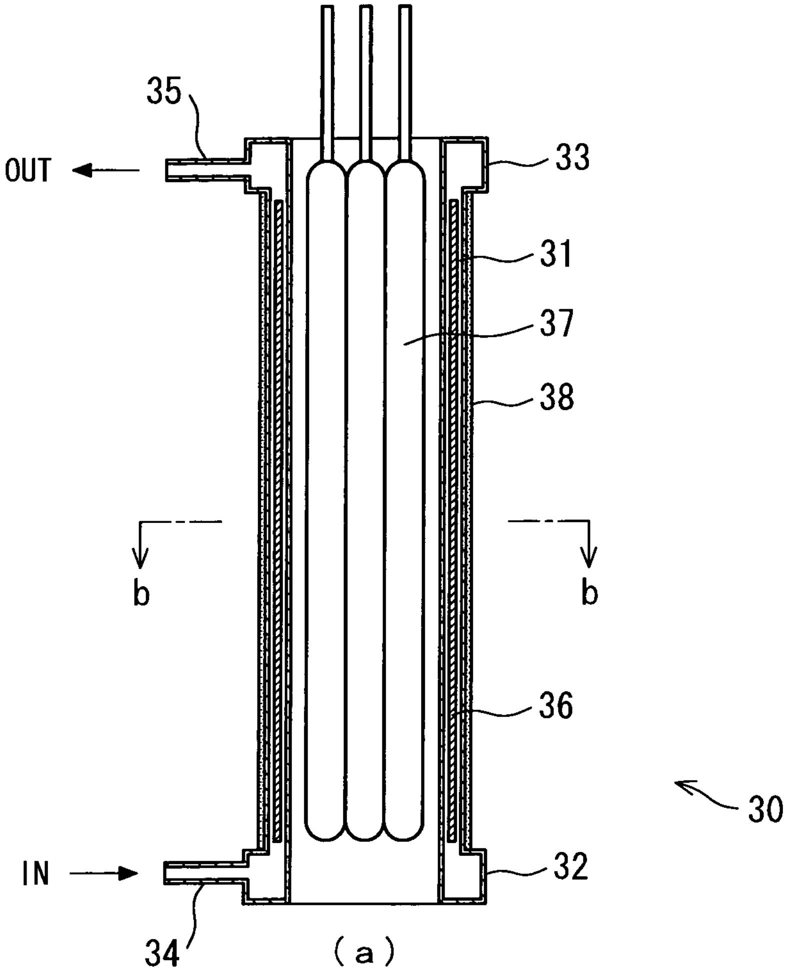
FIG. 6(*a*) is a schematic cross-sectional view of a liquid heating apparatus according to further another embodiment of the present invention along longitudinal direction thereof, and FIG. 6(*b*) is a cross-sectional view taken from line b-b in FIG. 6(*a*)
Figure 6:
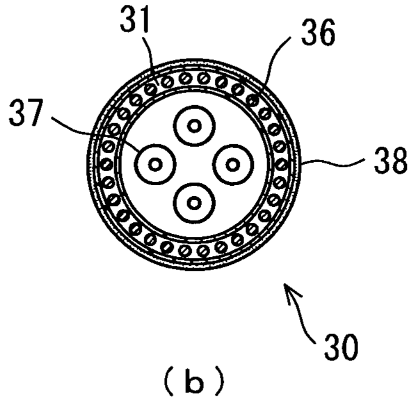
Figure 7:
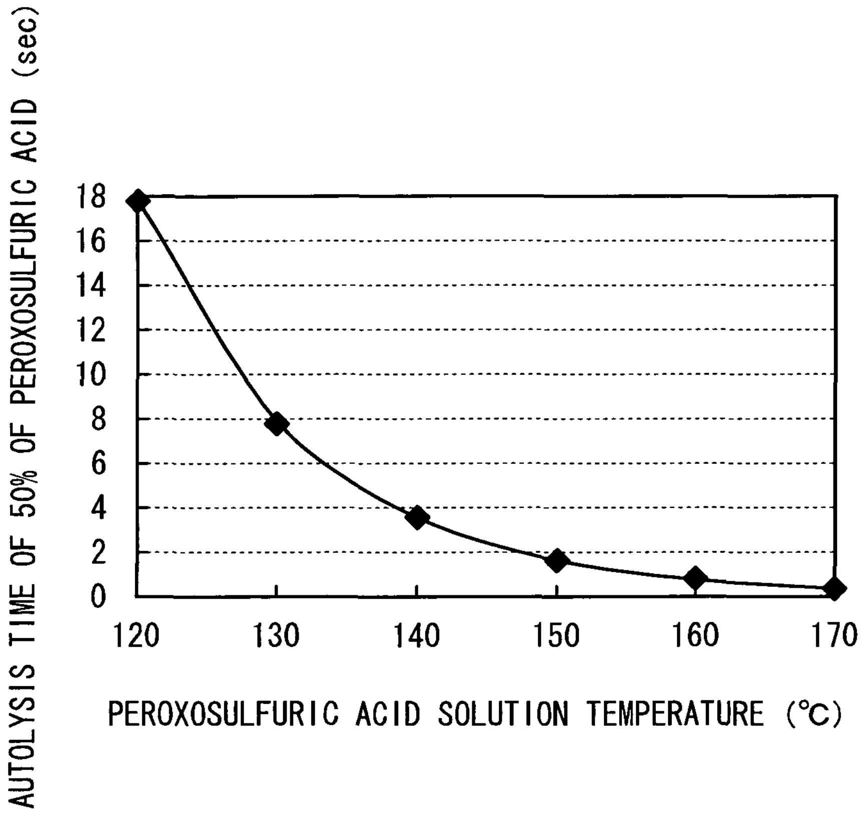
FIG. 7 is a graph showing the relationship between the temperature of peroxosulfuric acid solution (120° C. to 170° C.) and the lifetime of peroxosulfuric acid.

A liquid heating apparatus 30 shown in FIG. 6 has an annular flow channel 31 made of quartz, and having flow channel thickness of 10 mm or smaller. Tubular headers 32 and 33 formed by making flow channel thickness greater are, respectively, continuous with both ends of the annular flow channel 31. The header 32 at one end is provided at a liquid inlet portion, and an inflow tube 34 is connected to the header 32. The header 33 at the other end is provided at a liquid outlet portion, and an outflow tube 35 is connected to the header 33. Plural rod-shaped spacers 36 along longitudinal direction of the annular flow channel 31 are arranged in rows across the entire circumference of the annular flow channel 31. The rod-shaped spacers 36 are made of quartz and each has a diameter securing a small clearance between each rod-shaped spacer 36 and the annular flow channel 31.

Four rod-shaped near-infrared heaters 37 are placed over the outside of the annular flow channel 31 on the inner circumference side and along the longitudinal direction of the annular flow channel 31. On the other hand, near-infrared heaters are not placed over the outside of the annular flow channel 31 on the outer circumference side, but reflective material 38 such as gold or aluminum is coated on an outer surface on the outer circumference side. As a result, even if a near-infrared heater is not placed over the outside of the annular flow channel 31 on the outer circumference side, near-infrared rays emitted from the near-infrared heaters 37 are reflected on the reflective material 38, and liquid can be thus evenly heated from the outer and inner circumferences with the reflected heat. According to one embodiment of the present invention, near-infrared heaters are placed over the outside of the annular flow channel 31 on the outer circumference side and reflective material is coated on a outer surface of the annular flow channel 31 on the inner circumference side. Near-infrared heaters placed over the outside on the inner circumference side, however, can more effectively heat liquid to be heated.

Double-tube annular flow channel is cited as examples in the above embodiments to explain the liquid heating apparatus according to the present invention since it can be easily produced. The present invention, however, is not limited to the content of the above embodiments. Opposite flow channel surfaces may have flat or curved surfaces to form a band-shaped flow channel, for example.

EXAMPLE

Example 1

Sulfuric acid solution was heated using a liquid heating apparatus with an annular flow channel shown in FIG. 2.

Specifications of the liquid heating apparatus are as follows:

(Dimensions)

Diameter of Liquid Contacting Inner Surface of Annular Flow Channel: 40 mm diameter Diameter of Liquid Contacting Outer Surface of Annular Flow Channel: 45 mm diameter Diameter of Spacer: 2 mm diameter Length of Part of Flow Channel Performing Heating: 320 mm Total Length: 400 mm (Heater Capacity)

External Heaters: 2 kW×5=10 KW

Internal Heater: 3.2 kW×1=3.2 KW

Total: 13.2 kW

Sulfuric acid solution having a solution temperature of 65° C., a sulfuric acid concentration of 85% by weight, and a peroxosulfuric acid concentration of 20 g/liter was heated while flowing through the liquid heating apparatus 1 at the rate of 2 liter/min. The residence time in the heating part and in an outlet-side tube (an outlet-side connecting tube corresponding to a part designated as 5 in FIG. 2) was 3.5 seconds. Here, the temperature of the liquid was raised to 150° C., and the peroxosulfuric acid concentration at the outlet was 16.2 g/liter.

Comparative Example 1

Figure 8:
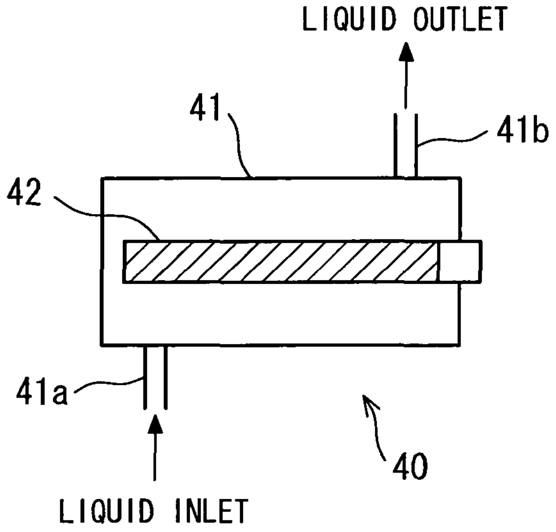
FIG. 8 is a schematic diagram showing an example of conventional liquid heating apparatuses.
Figure 9:
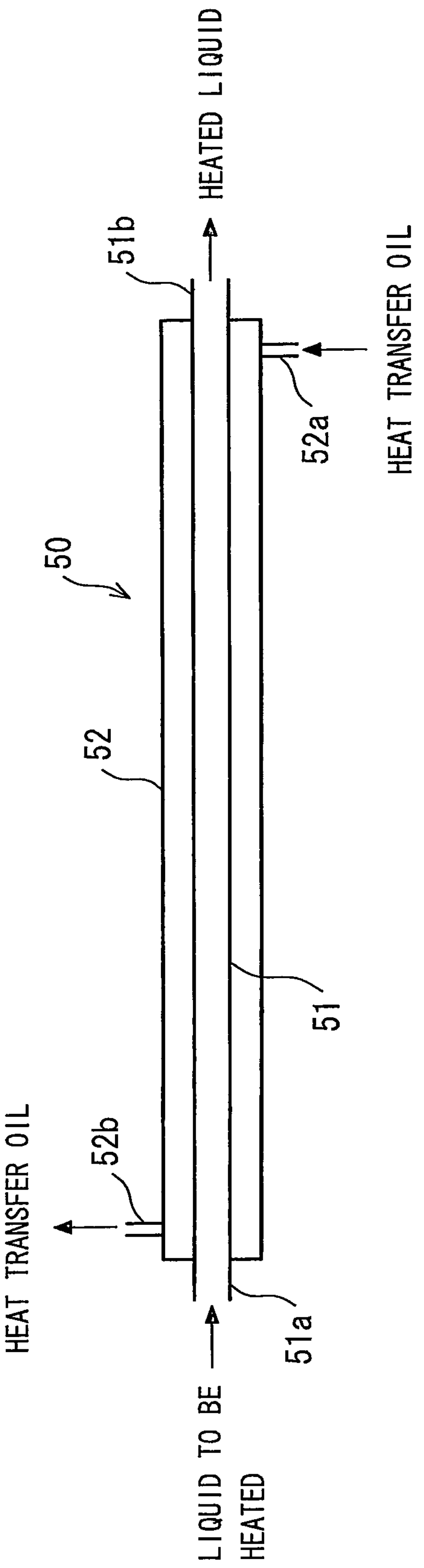
FIG. 9 is a schematic diagram showing another example of conventional liquid heating apparatuses.

Sulfuric acid solution was heated using a closed-vessel liquid heating apparatus 40 shown in FIG. 8.

That is, the temperature of 2 liter/min of the solution having a solution temperature of 65° C. and a peroxosulfuric acid concentration of 20 g/liter was increased to 150° C. using the liquid heating apparatus 40. The peroxosulfuric acid concentration at an outlet was 0.5 g/liter.

DESCRIPTION OF REFERENCE NUMERALS

1: liquid heating apparatus
3: header
4: annular flow channel
6: rod-shaped spacer
7: external heater
8: internal heater
20: liquid heating apparatus
21: annular flow channel
22: header
23: header
26: rod-shaped spacer
30: liquid heating apparatus
31: annular flow channel
32: header
33: header
36: rod-shaped spacer
37: near-infrared heater
38: reflective material

The invention claimed is:

1. A liquid heating apparatus for heating a liquid sulfuric acid solution including a peroxosulfuric acid for use in cleaning a semiconductor, comprising:

a liquid flow channel member forming a flow channel defining a passage through which the liquid flows and having a flow channel thickness of 10 mm or smaller, with the liquid flow channel member consisting solely of a radiation transparent quartz composition to transmit near-infrared rays in a heating zone from a near-infrared heater placed over the outside of at least one of opposite flow channel surfaces of the liquid flow channel member for heating the liquid in the flow channel; and at least one spacer placed within the quartz flow channel of thickness of 10 mm or smaller to reduce the volume of the flow channel, wherein each spacer is composed only of radiation transparent quartz, which transmits near-infrared rays, in a rod shaped configuration disposed along the liquid flowing direction and arranged in a row relative to one another within the flow channel.

2. The liquid heating apparatus according to claim 1, wherein the near-infrared heaters are placed over the outside of both the flow channel surfaces.

3. The liquid heating apparatus according to claim 1, wherein the flow channel forms an annular passage.

4. The liquid heating apparatus according to claim 1, comprising a plural number of spacers arranged in a row within the flow channel.

5. The liquid heating apparatus according to claim 1, wherein an orifice or a header is formed at a liquid inlet portion or at a liquid outlet portion of the flow channel in such a manner as to enlarge the flow channel area to promote even distribution of the liquid.

6. The liquid heating apparatus according to claim 1, wherein the liquid is sulfuric acid solution with concentration of 65% to 96% by weight.

7. The liquid heating apparatus according to claim 2, wherein the flow channel is an annular flow channel.

8. The liquid heating apparatus according to claim 2, wherein at least a portion of the flow channel member, the portion forming the flow channel surface of the side where the near-infrared heater is placed, is composed of quartz.

9. The liquid heating apparatus according to claim 3, wherein at least a portion of the flow channel member, the portion forming the flow channel surface of the side where the near-infrared heater is placed, is composed of quartz.

10. The liquid heating apparatus according to claim 2, wherein an orifice or a header is formed at a liquid inlet portion or at a liquid outlet portion of the flow channel in such a manner as to enlarge the flow channel area to promote even distribution of the liquid.

11. The liquid heating apparatus according to claim 3, wherein an orifice or a header is formed at a liquid inlet portion or at a liquid outlet portion of the flow channel in such a manner as to enlarge the flow channel area to promote even distribution of the liquid.

12. The liquid heating apparatus according to claim 4, wherein an orifice or a header is formed at a liquid inlet portion or at a liquid outlet portion of the flow channel in such a manner as to enlarge the flow channel area to promote even distribution of the liquid.

13. The liquid heating apparatus according to claim 2, wherein the liquid is sulfuric acid solution with concentration of 65% to 96% by weight.

14. The liquid heating apparatus according to claim 3, wherein the liquid is sulfuric acid solution with concentration of 65% to 96% by weight.

15. The liquid heating apparatus according to claim 4, wherein the liquid is sulfuric acid solution with concentration of 65% to 96% by weight.

16. The liquid heating apparatus according to claim 5, wherein the liquid is sulfuric acid solution with concentration of 65% to 96% by weight.

17. The liquid heating apparatus according to claim 1, wherein the liquid flow channel member has a water layer which absorbs essentially all of the near infrared rays transmitted through the quartz flow channel member.

18. A liquid heating method, comprising:

using the liquid heating apparatus of claim 1 to heat a liquid in the liquid heating apparatus with the liquid residence time in the liquid heating apparatus being maintained within a range of 0.5 to 5 seconds.

19. The liquid heating method according to claim 18, wherein liquid temperature differs by 50° C. or more between the liquid inlet portion and the liquid outlet portion in the flow channel of the liquid heating apparatus.

20. The liquid heating method according to claim 19, wherein liquid temperature is 60° C. to 80° C. at the liquid inlet portion, and liquid temperature is 120° C. to 190° C. at the liquid outlet portion.

* * * * *